United States Patent
Gottumukkala et al.

(10) Patent No.: US 10,587,704 B2
(45) Date of Patent: Mar. 10, 2020

(54) LOCATION ACCURATE MOBILE EVENTS AND SOCIAL CONTENT

(71) Applicant: International Business Machines Corporation, Armonk, NY (US)

(72) Inventors: Rajesh V. K. Gottumukkala, Hyderabad (IN); Ravi Kumar Reddy Kanamatareddy, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 407 days.

(21) Appl. No.: 14/685,858

(22) Filed: Apr. 14, 2015

(65) Prior Publication Data

US 2016/0308984 A1    Oct. 20, 2016

(51) Int. Cl.
*H04L 29/08* (2006.01)
*G01S 19/06* (2010.01)
(Continued)

(52) U.S. Cl.
CPC ............ *H04L 67/18* (2013.01); *G01S 19/06* (2013.01); *G01S 19/07* (2013.01); *G04R 20/02* (2013.01);
(Continued)

(58) Field of Classification Search
CPC ........ H04J 3/0635; H04L 67/18; H04L 51/32; G06F 21/62; G06F 1/12; G06F 1/04;
(Continued)

(56) References Cited

U.S. PATENT DOCUMENTS

| 5,510,798 A | 4/1996 | Bauer |
| 5,774,829 A * | 6/1998 | Cisneros ................. G01S 5/145 342/457 |

(Continued)

FOREIGN PATENT DOCUMENTS

| CN | 1833178 A | 9/2006 |
| CN | 1898975 A | 1/2007 |

(Continued)

OTHER PUBLICATIONS

Drawil, et al.; "A solution to the ill-conditioned GPS accuracy classification problem: Context based classifier"; 2011 IEEE GLOBECOM Workshops (GC Wkshps); pp. 1077-1082; E-ISBN: 978-1-4673-0038-4; Printed Jan. 16, 2015; <http://ieeexplore.ieee.org/xpl/freeabs_all.jsp?arnumber=6162344&abstractAccess=no&userType=inst>.

(Continued)

*Primary Examiner* — Patrice L Winder
*Assistant Examiner* — Angela M Widhalm de Rodrig
(74) *Attorney, Agent, or Firm* — Edward J. Wixted, III (57) ABSTRACT

In an approach for identifying a location of a mobile device a processor receives a first set of Global Positioning System (GPS) data at a time, wherein the time is specified by the mobile device. A processor synchronizes the time with Coordinated Universal Time (UTC). A processor retrieves offset values, wherein the offset values comprise one or more values to adjust one or more location coordinates based on the synchronized time, and wherein the offset values are determined by comparing a known set of location coordinates to a set of location coordinates calculated using another set of GPS data. A processor calculates location coordinates of the mobile device using the first set of GPS data and the offset values. A processor stores at least the (Continued)

location coordinates of the mobile device and the synchronized time.

19 Claims, 4 Drawing Sheets

(51) Int. Cl.
| G01S 19/07 | (2010.01) |
|---|---|
| G06F 21/62 | (2013.01) |
| G06F 1/04 | (2006.01) |
| H04J 3/06 | (2006.01) |
| G04R 20/02 | (2013.01) |
| G06F 1/12 | (2006.01) |
| G04R 40/06 | (2013.01) |
| H04L 12/58 | (2006.01) |

(52) U.S. Cl.
 CPC ............. *G04R 40/06* (2013.01); *G06F 1/04* (2013.01); *G06F 1/12* (2013.01); *G06F 21/62* (2013.01); *H04J 3/0635* (2013.01); *H04L 51/32* (2013.01)

(58) Field of Classification Search
 CPC .......... G01S 19/00; G01S 19/07; G01S 19/06; G04R 20/02; G04R 40/06; G04G 7/00; G04G 5/00
 See application file for complete search history.

(56) References Cited

U.S. PATENT DOCUMENTS

| 5,913,170 | A * | 6/1999 | Wortham | G01S 5/0263 |
|---|---|---|---|---|
| | | | | 342/357.31 |
| 5,940,027 | A | 8/1999 | Forseth et al. | |
| 6,329,945 | B1 | 12/2001 | Hynes | |
| 6,735,222 | B1 * | 5/2004 | Kingdon | H04B 7/2125 |
| | | | | 370/508 |
| 6,903,683 | B1 * | 6/2005 | Nicholson | G01S 19/05 |
| | | | | 342/357.42 |
| 7,440,762 | B2 * | 10/2008 | Maloney | G01S 19/09 |
| | | | | 342/357.29 |
| 7,466,264 | B2 * | 12/2008 | Lamance | G01S 19/05 |
| | | | | 342/356 |
| 7,750,845 | B2 * | 7/2010 | Lethbridge | G01S 19/05 |
| | | | | 342/357.22 |
| 8,416,130 | B2 | 4/2013 | Scherzinger | |
| 8,478,299 | B2 | 7/2013 | Chatterjee | |
| 8,600,297 | B2 * | 12/2013 | Ketchum | H04J 3/0688 |
| | | | | 455/12.1 |
| 8,620,345 | B2 | 12/2013 | Huang et al. | |
| 8,938,636 | B1 * | 1/2015 | Hochschild | H04J 3/0661 |
| | | | | 713/401 |
| 9,426,769 | B2 * | 8/2016 | Haro | H04W 4/021 |
| 2003/0103475 | A1 * | 6/2003 | Heppe | H04B 7/2681 |
| | | | | 370/321 |
| 2003/0210713 | A1 * | 11/2003 | Abdel-Ghaffar | H04B 7/2687 |
| | | | | 370/503 |
| 2004/0228428 | A1 * | 11/2004 | Cho | G04G 9/0076 |
| | | | | 375/354 |
| 2005/0226201 | A1 * | 10/2005 | McMillin | H04L 45/00 |
| | | | | 370/348 |
| 2007/0030841 | A1 * | 2/2007 | Lee | G01S 5/0027 |
| | | | | 370/352 |
| 2008/0070589 | A1 * | 3/2008 | Hansen | G01S 5/0036 |
| | | | | 455/456.1 |
| 2008/0211969 | A1 * | 9/2008 | Simon | H04H 20/18 |
| | | | | 348/725 |
| 2009/0135675 | A1 * | 5/2009 | Akiyama | G04G 9/0076 |
| | | | | 368/14 |
| 2009/0164115 | A1 * | 6/2009 | Kosakowski | G01C 21/3641 |
| | | | | 701/533 |
| 2010/0226342 | A1 * | 9/2010 | Colling | H04W 56/002 |
| | | | | 370/336 |
| 2012/0176504 | A1 * | 7/2012 | Lee | H04N 1/32101 |
| | | | | 348/222.1 |
| 2012/0177027 | A1 * | 7/2012 | Venkatraman | H04W 64/00 |
| | | | | 370/350 |
| 2013/0018705 | A1 * | 1/2013 | Heath | G08G 1/017 |
| | | | | 705/13 |
| 2013/0303199 | A1 * | 11/2013 | Siomina | H04W 64/00 |
| | | | | 455/456.5 |
| 2013/0339498 | A1 * | 12/2013 | Johnson | H04W 4/02 |
| | | | | 709/221 |
| 2014/0028498 | A1 * | 1/2014 | Lin | G01S 19/33 |
| | | | | 342/357.63 |
| 2015/0264588 | A1 * | 9/2015 | Li | H04W 56/0015 |
| | | | | 370/350 |
| 2015/0327159 | A1 * | 11/2015 | Gude | H04W 48/18 |
| | | | | 455/434 |
| 2015/0378322 | A1 * | 12/2015 | Bruins | G04R 20/00 |
| | | | | 368/47 |
| 2018/0011162 | A1 * | 1/2018 | Bovard | G01S 5/12 |

FOREIGN PATENT DOCUMENTS

| CN | 101971680 | A | 2/2011 |
|---|---|---|---|
| CN | 102272619 | A | 12/2011 |
| CN | 102455187 | A | 5/2012 |
| CN | 102480780 | A | 5/2012 |
| CN | 102754468 | A | 10/2012 |
| CN | 103076737 | A | 5/2013 |
| CN | 103220774 | A | 7/2013 |
| EP | 0522860 | B1 | 6/1996 |
| KR | 1020090077079 | A | 7/2009 |
| WO | 2008054191 | A2 | 5/2008 |

OTHER PUBLICATIONS

Huang, et al.; "Improve GPS positioning accuracy with contect awareness"; 2008 First IEEE International Conference on UBI-Media Computing; pp. 94-99; E-ISBN: 978-1-4244-1866-4; Printed Jan. 16, 2015; pp. 1-2; <http://ieeexplore.ieee.org/xpl/articleDetails.jsp?tp=arnumbrt=4570872&queryText%3DJiung-yao+Huang%2C+Chung-Hsien+Tsai%2C+Improve+GPS+Positioning+Accuracy+with+Context+Awareness.+2008%2C+First+IEEE+International+Conference+on+Ubi-Media+Computing>.

Lewandowski, et al.; "GPS: primary tool for time transfer"; Proceedings of the IEEE; vol. 87; Issue: 1; pp. 163-172; ISSN: 0018-9219; Printed Jan. 16, 2015; pp. 1-2; <http://ieeexplore.ieee.org/xpl/articleDetails.jsp?tp=&arnumber=736348&queryText%3DWlodzimierz+Lewandowski%2C+Jacques+Azoubib%2C+And+William+J.+Klepczynski%2C+GPS%3A+Primary+Tool+for+Time+Transfer.+1999%2C+Proceedings+of+IEEE>.

Mosavi, et al.: "Single-frequency GPS receivers ionspheric time-delay approximation using radial basis function neural network"; SMC 2009 IEEE International Conference on Systems, Man and Cybernetics; pp. 4592-4595; E-ISBN: 978-1-4244-2784-9; Printed Jan. 16, 2015; pp. 1-2; <http://ieeexplore.ieee.org/xpl/articalDetails.jsp?tp=&arnumber=5346770&queryText%3DM.+R.+Mosavi+and+H.+AmirMoini%2C+Single-Frequency+GPS+Receivers+Ionspheric+Time-Delay+Approximation+using+Radial+Basis+Function+Neural+Network.+2009%2C+Proceedings+of+the+2009+IEEE+International+Conference+on+Systems%2C+Man%2C+and+Cybernetics>.

Taylor, et al.; "Intelligent Positioning"; John Wiley & Sons, LTD; © 2006; pp. 1-192.

Tiberius, C.C.J.M.; "Recursive data processing for kinematic GPS surveying"; ISBN: 90 6132 265 0; pp. 1-142.

Wang, et al.; "A Flexible Spatio-Temporal Indexing Scheme for Large-Scale GPS Track Retrieval"; Ninth International Conference on Mobile Data Management; ISBN: 978-0-7695-3154-0; Printed Jan. 16, 2015; pp. 1-2; <http://ieeexplore.ieee.org/xpl/articleDetails.jsp?tp=&arnumber=4511428&queryText%3DLonghao+Wang%2C+Yu+Zheng%2C+Xing+Xie%2C+Wei+Ying+Ma%2C+A+Flexible+

(56) References Cited

OTHER PUBLICATIONS

Spatio+temporal+Indexing+Scheme+for+Large-scale+GPS+Track+Retrieval.+2008%2C+The+Ninth+International+Conference+on+Mobile+Data+Management>.

Yamaguchi, et al.; "GPS Standard Positioning using Kalman filter"; International Conference SICE-ICASE; ; E-ISBN: 89-950038-5-5; Printed Jan. 16, 2015; pp. 1-2; <http://ieeexplore.ieee.org/xpl/articleDetails.jsp?tp=&arnumber=4109175&queryText%3DSeiji+Yamaguchi+and+Toshiyuki+Tanaka%2C+GPS+Standard+Positioning+using+Kalman+filter.+2006%2C+SICE-ICASE+International+Joint+Conference>.

"MSF Whitepaper on Location Services in LTE Networks"; MultiService Forum; © 2009; pp. 1-19.

"Think GPS is cool? IPS will blow your mind"; ExtremeTech; Printed Jan. 16, 2015; pp. 1-4; <http://www.extremetech.com/extreme/126843-think-gps-is-cool-ips-will-blow-your-mind>.

Van Diggelen; "A-GPS: Assisted GPS, GNSS, and SBAS"; © 2009; Artech House; pp. 1-21.

Kanamatareddy et al., "Location Accurate Mobile Events and Social Content", IBM China Application No. 201610229063.3, Filed Apr. 13, 2016, 19 pages.

\* cited by examiner

LOCATION ACCURATE MOBILE EVENTS AND SOCIAL CONTENT

BACKGROUND

The present invention relates generally to the field of mobile device location identification, and more particularly to utilizing a coordinated universal time (UTC) synchronization to enhance location identification and to store location information for access and use by applications.

The Global Positioning System (GPS) is a satellite-based navigation system made up of a network of satellites placed in orbit. GPS satellites circle the Earth and continually transmit messages to Earth which include the time the message was transmitted and the satellite position at the time of the message transmission. A GPS receiver uses the messages it receives from multiple satellites to determine the transmit time of each message to calculate the location of the GPS receiver.

UTC is the primary time standard by which the world regulates clocks and time. UTC is one of several closely related successors to Greenwich Mean Time (GMT). The current version of UTC is based on International Atomic Time (TAI) with leap seconds added at irregular intervals to compensate for the slowing of Earth's rotation.

SUMMARY

Aspects of an embodiment of the present invention disclose a method, computer program product, and computer system for identifying a location of a mobile device. A processor receives a first set of Global Positioning System (GPS) data at a time, wherein the time is specified by the mobile device. A processor synchronizes the time with Coordinated Universal Time (UTC). A processor retrieves offset values, wherein the offset values comprise one or more values to adjust one or more location coordinates based on the synchronized time, and wherein the offset values are determined by comparing a known set of location coordinates to a set of location coordinates calculated using another set of GPS data. A processor calculates location coordinates of the mobile device using the first set of GPS data and the offset values. A processor stores at least the location coordinates of the mobile device and the synchronized time.

DETAILED DESCRIPTION

Embodiments of the present invention recognize inaccuracies, such as ionospheric errors caused by inconsistencies of atmospheric conditions, can decrease the precision of location calculations for Global Positioning System (GPS) receivers. Embodiments of the present invention provide an approach for augmenting GPS location calculations through the use of a time synchronization to Coordinated Universal Time (UTC) and a retrieval of offset values corresponding to differences between known location coordinates and location coordinates calculated with GPS data at a remote location. In addition, embodiments of the present invention recognize that applications on a mobile device can have increased utility when given the capability to utilize location information, and other information obtained in determining the location of a mobile device. Further, embodiments of the present invention recognize that such location information can be stored on a mobile device, and shared as a form of content among connected users via, for example, a social network.

The present invention will now be described in detail with reference to the Figures.

Figure 1:
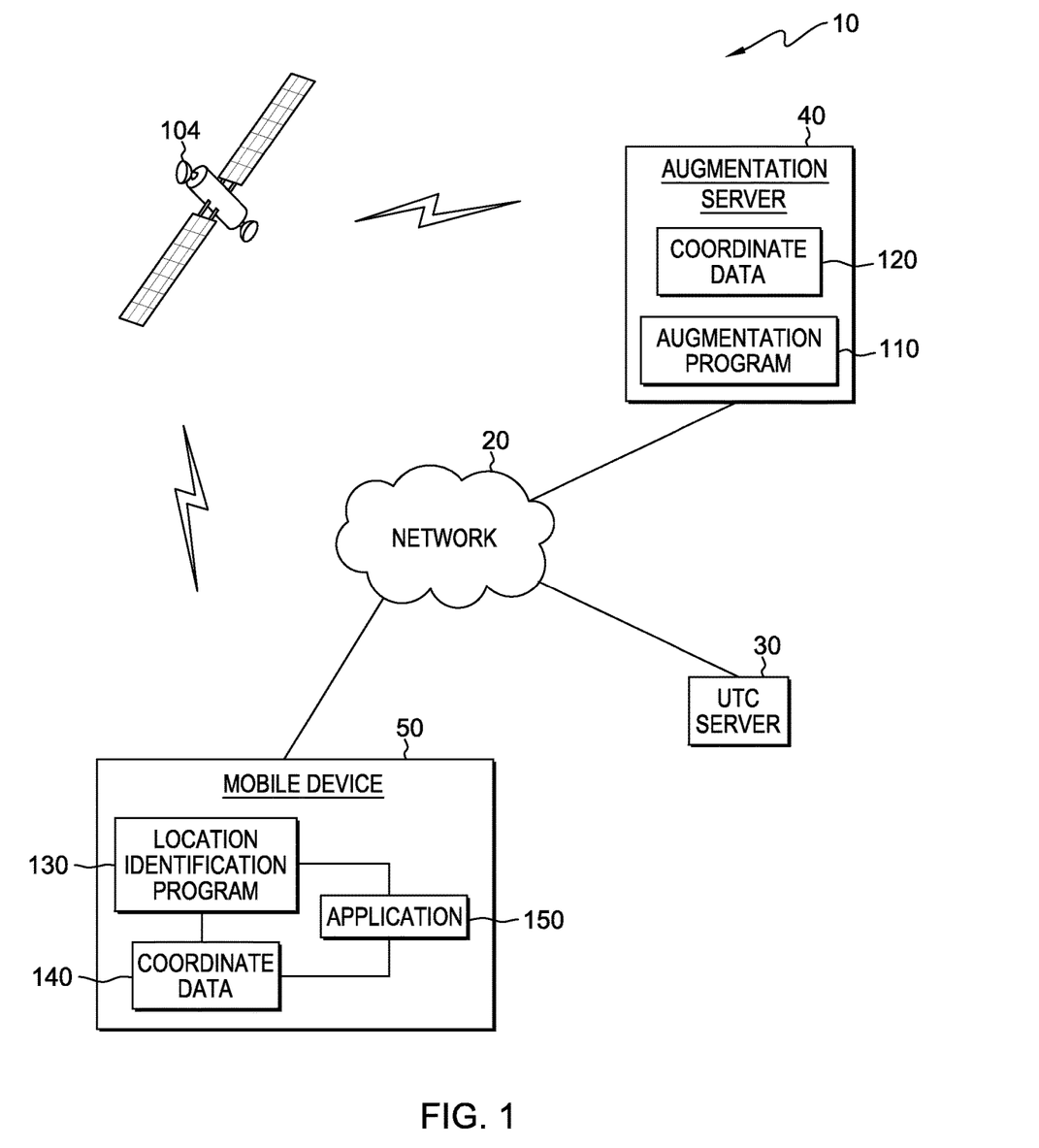
FIG. 1 depicts a diagram of a computing environment, in accordance with one embodiment of the present invention.

FIG. 1 depicts a diagram of computing environment 10, in accordance with one embodiment of the present invention. Figure one provides only an illustration of one embodiment and does not imply any limitations with regard to the environments in which different embodiments can be implemented.

In the depicted embodiment, computing environment 10 includes Coordinated Universal Time (UTC) server 30, augmentation server 40, and mobile device 50 interconnected over network 20. Computing environment 10 also includes GPS satellite 104. Network 20 can be a local area network (LAN), a wire area network (WAN) such as the Internet, the public switched telephone network (PSTN), any combination thereof, or any combination of connections and protocols that will support communications between UTC server 30, augmentation server 40, and mobile device 50, in accordance with embodiments of the invention. Network 20 can include wired, wireless, or fiber optic connections. Computing environment 10 can include additional computing devices, servers, computers, mobile devices, or other devices not shown.

UTC server 30 can be a management server, a web server, or any other electronic device or computing system capable of receiving and sending data. In some embodiments, UTC server 30 can be a laptop computer, tablet computer, netbook computer, personal computer (PC), a desktop computer, or any programmable electronic device capable of communicating with augmentation server 40 and mobile device 50 via network 20. In other embodiments, UTC server 30 can represent a server computing system utilizing multiple computers as a server system, such as in a cloud computing environment. In another embodiment, UTC server 30 represents a computing system utilizing clustered computers and components to act as a single pool of seamless resources. In general, UTC server 30 can be capable of providing UTC time in response to received queries for UTC time. UTC server 30 can include components, as depicted and described in further detail with respect to FIG. 4.

GPS satellite 104 is a satellite used by the NAVSTAR GPS. In general, GPS satellite 104 is representative of one or more GPS satellites used by a GPS system, such as the NAVSTAR GPS. In general, GPS satellite 104 transmits data which contains the current time and position of the one or more GPS satellites.

Augmentation server 40 can be a management server, a web server, or any other electronic device or computing system capable of receiving and sending data. In some embodiments, augmentation server 40 can be a laptop computer, tablet computer, netbook computer, PC, a desktop computer, or any programmable electronic device capable of receiving GPS data from GPS satellite 104 and communicating with UTC server 30 and mobile device 50 via network 20. In general, augmentation server 40 includes known location coordinates (e.g., latitude, longitude, altitude) indicating the location of the augmentation server. In some embodiments, augmentation server 40 is stationary, and does not move, or is infrequently moved, to another location. In some embodiments, augmentation server 40 contains GPS receivers (not shown). In other embodiments, augmentation server 40 can represent a server computing system utilizing multiple computers as a server system, such as in a cloud computing environment. In another embodiment, augmentation server 40 represents a computing system utilizing clustered computers and components to act as a single pool of seamless resources. Augmentation server 40 contains augmentation program 110 and coordinate data 120. Augmentation server 40 can include components, as depicted and described in further detail with respect to FIG. 4.

Augmentation program 110 operates to generate offset values (e.g., values indicating the accuracy of received GPS data), based on a comparison to known location coordinates associated with a device, such as augmentation server 40 or GPS receivers (not shown). In some embodiments, augmentation program 110 synchronizes time associated with such offset values to UTC time via communications with UTC server 30. In one embodiment, augmentation program 110 resides on augmentation server 40. In other embodiments, augmentation program 110 can reside on another server or another computing device, provided that the augmentation program has access to coordinate data 120.

Coordinate data 120 can be a repository that can be written and read by augmentation program 110, and can be read by location identification program 130. Known location coordinates of augmentation server 40 can be stored to coordinate data 120. In addition, location coordinates calculated from received GPS data, corresponding UTC time, offset values, and/or other information can be stored to coordinate data 120. Offset values are values generated by augmentation program 110 which can be used to approximate errors in received GPS data and corresponding coordinates generated from such received GPS data. In one embodiment, coordinate data 120 resides on augmentation server 40. In other embodiments, coordinate data 120 can reside on another server or another computing device, provided that the coordinate data is accessible to augmentation program 110 and location identification program 130.

Mobile device 50 can be a laptop computer, netbook computer, tablet computer, PDA, GPS device, smart phone, or cell phone. In general, mobile device 50 can be any electronic device or computing system capable of receiving GPS data from GPS satellite 104, sending and receiving data, and communicating with UTC server 30 and augmentation server 40 over network 20. In some embodiments, mobile device 50 contains GPS receivers (not shown). Mobile device 50 contains location identification program 130, coordinate data 140, and application 150. Mobile device 50 can include components, as depicted and described in further detail with respect to FIG. 4.

Location identification program 130 is a location identification program which utilizes GPS data, UTC time synchronization, and offset values obtained from an augmentation service, such as an augmentation service provided by augmentation server 40 and augmentation program 110, to determine the physical location of mobile device 50. In one embodiment, location identification program 130 resides on mobile device 50. In other embodiments, location identification program 130 can reside on another server or another computing device, provided that the location identification program has access to GPS receivers (not shown) of mobile device 50, and coordinate data 140.

Coordinate data 140 can be a repository that can be written and read by location identification program 130, and can be read by application 150. Location coordinates and corresponding UTC time, offset values, and/or other information can be stored to coordinate data 140. In one embodiment, coordinate data 140 resides on mobile device 50. In other embodiments, coordinate data 140 can reside on another server or another computing device, provided that the coordinate data is accessible to location identification program 130 and application 150.

Application 150 can be any application, software, or program that utilizes location information, such as GPS coordinates. Application 150 can utilize location information for a variety of purposes, and such purposes may not be vital to the operation of the application. In some embodiments, application 150 utilizes social networks, or enables a user to maintain links to other users, and location information can be posted, or otherwise shared between users. In some embodiments, application 150 allows a user to share, or otherwise transfer, information stored to coordinate data 140, such that another user or another computing device may receive such information. In such embodiments, application 150 can utilize location information stored to coordinate data 140 such that the location information acts as a form of social content and the location information, along with other possible information provided by the application, can be accessible and/or made useful to a user and distributed to other computing devices.

Figure 2:
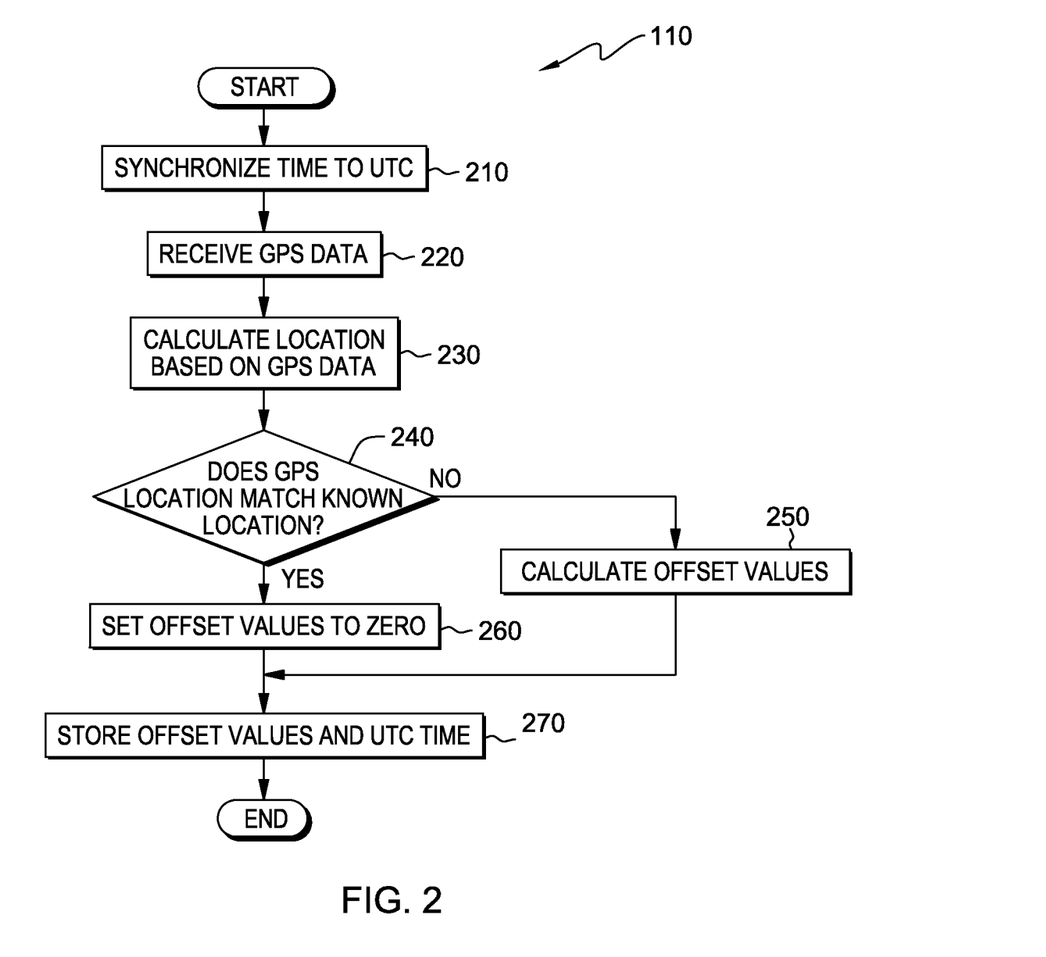
FIG. 2 depicts a flowchart of the steps of an augmentation program executing within the computing environment of FIG. 1, for identifying discrepancies between known location coordinates and location coordinates calculated using received Global Positioning System (GPS) data, in accordance with one embodiment of the present invention.

FIG. 2 is a flowchart of the steps of augmentation program 110, operating on augmentation server 40, for determining offset values (e.g., values to account for differences between known coordinate locations, and coordinate locations calculated based upon received GPS data), and associating such offset values with UTC time, in accordance with one embodiment of the present invention.

In one embodiment, initially, augmentation server 40 is placed at a location with known geographic coordinates or, alternatively, geographic coordinates are obtained at the location of the augmentation server. In embodiments of the present invention, augmentation program 110 uses the geographic coordinates to determine offset values. In some embodiments, the geographic coordinates are selected based on previously obtained geographic location information. In other embodiments, the geographic coordinates are determined via GPS, trilateration, or other techniques. In some embodiments, the accuracy of the geographic coordinates of augmentation server 40 can be enhanced by collecting GPS data, or otherwise obtaining information to calculate the geographic coordinates, over a period of time. In such an embodiment, a collection of data samples can be used to create an average geographic location (e.g., an average set of geographic coordinates), and augmentation program 110 can use the average geographic location, rather than known geographic coordinates. In some embodiments, the known location of augmentation server 40 is stored to coordinate data 120, and is accessible to augmentation program 110.

In step 210, augmentation program 110 synchronizes time associated with augmentation server 40 and/or the augmentation program to UTC. For example, augmentation program 110 can synchronize an internal clock of augmentation server 40 to UTC. In one embodiment, augmentation program 110 synchronizes such an internal clock with UTC time retrieved from UTC server 30. In some embodiments, augmentation program 110 utilizes Network Time Protocol (NTP) to synchronize time associated with augmentation server 40 and/or the augmentation program to UTC. NTP is a networking protocol for clock synchronization between computer systems over data networks. NTP is intended to synchronize all participating computers to within a few milliseconds of UTC. In some embodiments, augmentation program 110 periodically synchronizes the time to UTC. In other embodiments, augmentation program 110 synchronizes the time to UTC upon receiving GPS data (see step 220).

In step 220, augmentation program 110 receives GPS data from, for example, a GPS receiver of augmentation server 40. GPS satellites, such as GPS satellite 104, continuously broadcast signals which can be used by GPS receivers, such as a GPS receiver of augmentation server 40, to determine the time of arrival to the GPS receiver, the time of transmission by the GPS satellite, and the position of the GPS satellite at the time of transmission. In embodiments of the present invention, augmentation program 110 receives GPS data obtained from at least four GPS satellites. In some embodiments, rather than receiving GPS data, augmentation program 110 receives a location of augmentation server 40, as calculated by a GPS receiver of the augmentation server, using received GPS data.

In step 230, augmentation program 110 calculates the location (i.e., geographic coordinates) of augmentation server 40 using the received GPS data (see step 220). In some embodiments, augmentation program 110 calculates the location according to GPS receiver calculations known in the art. In other embodiments, the GPS receiver of augmentation server 40 calculates the location of the augmentation server and passes the location of the augmentation server to augmentation program 110.

In decision 240, augmentation program 110 determines whether the location of augmentation server 40, as calculated using the GPS data, matches the known location of the augmentation server, as described above. In one embodiment, augmentation program 110 compares the location of augmentation server 40, as calculated using the GPS data to the known location of the augmentation server. In some embodiments, the known location of augmentation server 40 is stored to coordinate data 120. In some embodiments, augmentation program 110 determines whether the location of augmentations server 40, as calculated using the GPS data, matches, within a predefined threshold, the known location of the augmentation server. Such a threshold can enable a user of augmentation program 110 to adjust accuracy parameters based upon the accuracy of associate GPS receivers of augmentation server 40 and/or desired levels of accuracy for applications, such as location identification program 130, accessing information stored by the augmentation program. If augmentation program 110 determines that the location of augmentation server 40, as calculated using the GPS data, does not match the known location of the augmentation server (decision 240, no branch), the augmentation program calculates offset values (see step 250). If augmentation program 110 determines that the location of augmentation server 40, as calculated using the GPS data, does match the known location of the augmentation server (decision 240, yes branch), the augmentation program sets the offset values to zero, or otherwise indicates that there are no offset values (see step 260).

In step 250, augmentation program 110 calculates offset values. As described above, the location of augmentation server 40, as calculated using the GPS data, and the known location of the augmentation server, can each be in the form of, for example, geographic coordinates (e.g., longitude, latitude, altitude). In some embodiments, location can be presented according to another coordinate scheme. In some embodiments, augmentation program 110 compares the location of augmentation server 40, as calculated using the GPS data, to the known location of the augmentation server and calculates the difference(s) between each aspect of the location. For example, if the coordinate scheme includes longitude, latitude, and altitude, augmentation server 40 can compare each coordinate type and identify the difference in value between the respective coordinate type of the location of the augmentation server, as calculated using the GPS data, and the known location of the augmentation server. Augmentation program 110 calculates offset values such that the offset values are able to convert the location of augmentation server 40, as calculated using the GPS data, to the known location of the augmentation server.

In step 260, augmentation program 110 sets the offset values to zero in response to the augmentation program determining that the location of augmentation server 40, as calculated using the GPS data, matches the known location of the augmentation server. As described above, in some embodiments, augmentation program 110 can also set the offset values to zero in response to the augmentation program determining that the location of augmentation server 40, as calculated using the GPS data, matches, within a predefined threshold, the known location of the augmentation server.

In step 270, augmentation program 110 stores offset values and the time (i.e., UTC) associated with the offset values for access by applications, such as location identification program 130.

Figure 3:
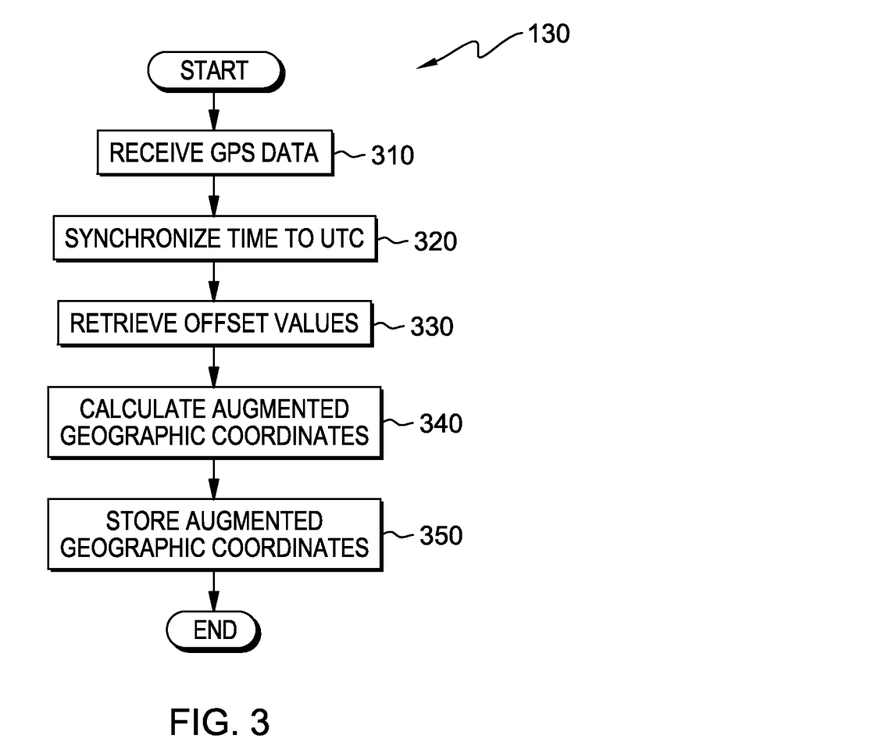
FIG. 3 depicts a flowchart of the steps of a location identification program executing within the computing environment of FIG. 1, for calculating location information, in accordance with one embodiment of the present invention.

FIG. 3 depicts a flowchart of the steps of location identification program 130, executing within mobile device 50 of FIG. 1, in accordance with an embodiment of the present invention. Location identification program 130 operates to generate and store geographic coordinates, or other location information, of mobile device 50, and associate such geographic coordinates with UTC corresponding to the time the geographic coordinates were obtained. In addition, embodiments of location identification program 130 allow for stored location coordinates associated with UTC to be accessed and used by applications and programs, such as application 10, located on mobile device 50. In some embodiments, stored location coordinates can be accessible such that a user of mobile device 50 can share the location information (e.g., time, UTC offset, calculated location, location offset) with another user or upload aspects of the location information as social content, for access by users of a social network.

In step 310, location identification program 130 receives GPS data from, for example, a GPS receiver of mobile device 50. As described above, GPS satellites, such as GPS satellite 104, continuously broadcast signals that can be used by GPS receivers, such as a GPS receiver of mobile device 50, to determine the time of arrival to the GPS receiver, the time of transmission by the GPS satellite, and the position of the GPS satellite at the time of transmission. In embodiments of the present invention, location identification program 130 receives GPS data obtained from at least four GPS satellites. In some embodiments, rather than receiving GPS data, location identification program 130 receives a location of mobile device 50, as calculated by a GPS receiver of the mobile device, using the received GPS data.

In some embodiments, location identification program 130 or a GPS receiver of mobile device 50 can regulate the intervals or rate at which GPS data is obtained. In some embodiments, GPS data may not need to be continuously obtained. For example, two instances of data may need to be obtained at different intervals depending upon the speed or velocity at which mobile device 50 is traveling (e.g., user of the mobile device walking, running, riding in a car), the number of satellites accessible to the mobile device, frequency of requests from application 150, or other factors. In some embodiments, location identification program 130 or a GPS receiver of mobile device 50 may include one or more modes, wherein each mode specifies a frequency for data collection. Each mode can be optimized according to the factors described herein.

In step 320, location identification program 130 synchronizes time associated with mobile device 50 and/or the location identification program to UTC. For example, location identification program 130 can synchronize an internal clock of mobile device 50 to UTC. In one embodiment, location identification program 130 synchronizes such an internal clock with UTC time retrieved from UTC server 30. In some embodiments, location identification program 130 utilizes Hypertext Transfer Protocol (HTTP) or a service call to UTC server 30 to obtain time in UTC. In some embodiments, location identification program 130 utilizes NTP to synchronize time associated with mobile device 50 and/or the location identification program to UTC. As described above, NTP is a networking protocol for clock synchronization between computer systems over data networks. NTP is intended to synchronize all participating computers to within a few milliseconds of UTC. In some embodiments, location identification program 130 synchronizes the time to UTC upon receiving GPS data (see step 310). In other embodiments, rather than synchronizing the time associated with mobile device 50 and/or location identification program 130 to UTC, the location identification program accesses UTC server 30, retrieves the UTC time, and identifies a difference in time between UTC time and the time associated with the mobile device and/or the location identification program. In such an embodiment, location identification program 130 may generate time difference values between UTC time and the time associated with mobile device 50 and/or the location identification program.

In step 330, location identification program 130 retrieves offset values corresponding to the time, in UTC, associated with the received GPS data. As described above (see FIG. 2), augmentation program 110 calculates offset values indicating a difference between geographic coordinates calculated using GPS data and known geographic coordinates associated with augmentation server 40. In some embodiments, the offset values are associated with UTC and stored to coordinate data 120. In some embodiments, location identification program 130 accesses coordinate data 120 and retrieves offset values associated with the UTC time corresponding to the received GPS data. In some embodiments, location identification program 130 retrieves offset values via HTTP or a service request.

In step 340, location identification program 130 calculates the augmented geographic coordinates of mobile device 50. As described above, location identification program 130, or a GPS receiver of mobile device 50 may calculate geographic coordinates using the received GPS data. After geographic coordinates are calculated using the received GPS data, location identification program 130 applies the retrieved offset values to the calculated geographic coordinates to generate a set of augmented geographic coordinates. For example, the offset values can specify adjustments to latitude, longitude, and/or altitude coordinates, of either positive or negative values, and such values can be used to adjust the geographic coordinates calculated from the received GPS data.

In step 350, in some embodiments, location identification program 130 stores the augmented geographic coordinates, along with associated UTC time, and can also store additional information. In one embodiment, such information is stored to coordinate data 140. Information stored to coordinate data 140 can include, for example, an identification number associated with the particular instance (i.e., the particular record), the local time of the device upon receipt of the GPS data (e.g., internal clock time of mobile device 50), UTC time upon receipt of the GPS data, a difference between UTC time and local time of mobile device 50, geographic coordinates calculated from the GPS data, augmented GPS coordinates, retrieved offset values, number of satellites from which GPS data was received, or other information.

In some embodiments, information stored to coordinate data 140 is accessible to applications on mobile device 50, such as application 150. In some embodiments, location identification program 130, or another program, may grant application 150 access to information stored to coordinate data 140. Applications, such as application 150, may be able to utilize such information to generate events, notifications, or create other content relying upon geographic coordinates and location information. Because UTC time, and local time is stored, if application 150 utilizes local time associated with the device, rather than UTC time, stored augmented geographic coordinates still remain accessible and useful to such an embodiment of the application. In some embodiments, application 150 can utilize stored information to share content with other users, post content to a social network, or otherwise share information, in accordance with privacy settings and utility of the application. In some embodiments, a user of mobile device 50 may have access to stored information, such that the user can utilize the information and/or share the information with other users.

Figure 4:
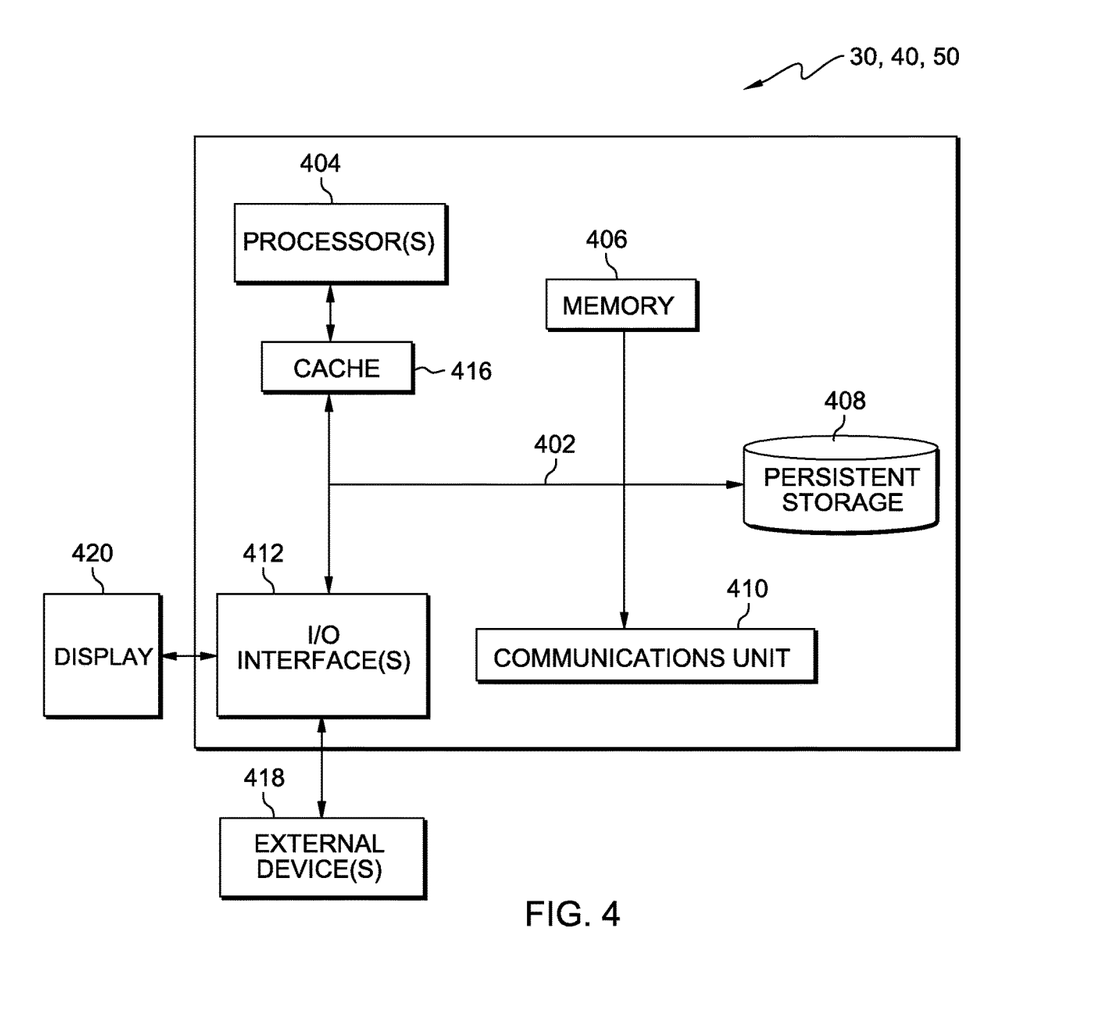
FIG. 4 depicts a block diagram of components of the UTC server, augmentation server, and mobile device of FIG. 1, in accordance with one embodiment of the present invention.

FIG. 4 depicts a block diagram of components of UTC server 30, augmentation server 40, and mobile device 50, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

UTC server 30, augmentation server 40, and mobile device 50 each include, respectively, communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Augmentation program 110 and coordinate data 120 may each be stored in persistent storage 408 of augmentation server 40 and in memory 406 of the augmentation server for execution and/or access by one or more of the respective computer processors 404 of the augmentation server via cache 416 of the augmentation server. Location identification program 130, coordinate data 140, and application 150 may each be stored in persistent storage 408 of mobile device 50 and in memory 406 of the mobile device for execution and/or access by one or more of the respective computer processors 404 of the mobile device via cache 416 of the mobile device. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Augmentation program 110 and coordinate data 120 may each be downloaded to persistent storage 408 of augmentation server 40 through communications unit 410 of the augmentation server. Location identification program 130, coordinate data 140, and application 150 may each be downloaded to persistent storage 408 of mobile device 50 through communications unit 410 of the mobile device.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., augmentation program 110 and coordinate data 120, can be stored on such portable computer readable storage media and can be loaded onto persistent storage 408 of augmentation server 40 via I/O interface(s) 412 of the augmentation server. Software and data used to practice embodiments of the present invention, e.g., location identification program 130, coordinate data 140, and application 150, can be stored on such portable computer readable storage media and can be loaded onto persistent storage 408 of mobile device 50 via I/O interface(s) 412 of the mobile device. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying a location of a mobile device, the method comprising:
    receiving, at a mobile device, a first set of Global Positioning System (GPS) data at a time, wherein the time is specified by the mobile device;
    upon receiving the first set of GPS data, synchronizing, by one or more processors of the mobile device, the time with Coordinated Universal Time (UTC) specified by a first server, wherein:
        the first server specifies only unmodified UTC time to the mobile device; and
        the synchronizing comprises retrieving, by one or more processors of the mobile device, the unmodified UTC time from the first server;
    retrieving, by one or more processors of the mobile device, offset values from an alternate device, wherein:
        the offset values comprise one or more values to adjust one or more location coordinates and the offset values are associated with the synchronized time; and
        the offset values that are associated with the synchronized time are determined by:
            upon receiving a second set of GPS data at the alternate device, synchronizing time specified by the alternate device with unmodified UTC time specified by the first server, wherein the first server specifies only unmodified UTC time to the alternate device;
            generating the offset values by comparing a known set of location coordinates of the alternate device to a set of location coordinates calculated using the second set of GPS data; and
            associating the synchronized time with the offset values;
    calculating, by one or more processors of the mobile device, location coordinates of the mobile device using the first set of GPS data and the offset values; and
    storing, by one or more processors of the mobile device, at least the location coordinates of the mobile device and the synchronized time.

2. The method of claim 1, further comprising:
    granting, by one or more processors, an application access to at least the stored location coordinates of the mobile device and the synchronized time.

3. The method of claim 1, further comprising:
    uploading, by one or more processors, at least the location coordinates of the mobile device, the offset values, and the synchronized time as content on a social network.

4. The method of claim 1, further comprising:
    calculating, by one or more processors, a velocity of the mobile device based on the location coordinates of the mobile device and a set of one or more stored location coordinates; and
    determining, by one or more processors, a rate at which GPS data is to be collected based on, at least, the calculated velocity of the mobile device.

5. The method of claim 1, wherein synchronizing the time with UTC comprises:

synchronizing, by one or more processors, the time with UTC using Network Time Protocol (NTP).

6. The method of claim 1, wherein synchronizing the time with UTC comprises:
responsive to the time being different than UTC, adjusting, by one or more processors, the time to UTC.

7. The method of claim 1, wherein synchronizing the time with UTC comprises:
responsive to the time being different than UTC, storing, by one or more processors, a difference in time between the time and UTC.

8. A computer program product for identifying a location of a mobile device, the computer program product comprising:
one or more computer readable storage media and program instructions stored on the one or more computer readable storage media, the program instructions comprising:
program instructions to receive, at a mobile device, a first set of Global Positioning System (GPS) data at a time, wherein the time is specified by the mobile device;
program instructions to, upon receiving the first set of GPS data, synchronize the time with Coordinated Universal Time (UTC) specified by a first server, wherein:
the first server specifies only unmodified UTC time to the mobile device; and
the synchronizing comprises program instructions to retrieve the unmodified UTC time from the first server;
program instructions to retrieve offset values from an alternate device, wherein:
the offset values comprise one or more values to adjust one or more location coordinates and the offset values are associated with the synchronized time; and
the offset values that are associated with the synchronized time are determined by:
upon receiving a second set of GPS data at the alternate device, synchronizing time specified by the alternate device with unmodified UTC time specified by the first server, wherein the first server specifies only unmodified UTC time to the alternate device;
generating the offset values by comparing a known set of location coordinates of the alternate device to a set of location coordinates calculated using the second set of GPS data; and
associating the synchronized time with the offset values;
program instructions to calculate location coordinates of the mobile device using the first set of GPS data and the offset values; and
program instructions to store at least the location coordinates of the mobile device and the synchronized time.

9. The computer program product of claim 8, further comprising:
program instructions, stored on the one or more computer readable storage media, to grant an application access to at least the stored location coordinates of the mobile device and the synchronized time.

10. The computer program product of claim 8, further comprising:
program instructions, stored on the one or more computer readable storage media, to upload at least the location coordinates of the mobile device, the offset values, and the synchronized time as content on a social network.

11. The computer program product of claim 8, further comprising:
program instructions, stored on the one or more computer readable storage media, to calculate a velocity of the mobile device based on the location coordinates of the mobile device and a set of one or more stored location coordinates; and
program instructions, stored on the one or more computer readable storage media, to determine a rate at which GPS data is to be collected based on, at least, the calculated velocity of the mobile device.

12. The computer program product of claim 8, wherein program instructions to synchronize the time with UTC comprise:
program instructions to synchronize the time with UTC using Network Time Protocol (NTP).

13. The computer program product of claim 8, wherein program instructions to synchronize the time with UTC comprise:
program instructions to, responsive to the time being different than UTC, adjust the time to UTC.

14. The computer program product of claim 8, wherein program instructions to synchronize the time with UTC comprise:
program instructions to, responsive to the time being different than UTC, store a difference in time between the time and UTC.

15. A computer system for identifying a location of a mobile device, the computer system comprising:
one or more computer processors, one or more computer readable storage media, and program instructions stored on the one or more computer readable storage media for execution by at least one of the one or more processors, the program instructions comprising:
program instructions to receive, at a mobile device, a first set of Global Positioning System (GPS) data at a time, wherein the time is specified by the mobile device;
program instructions to, upon receiving the first set of GPS data, synchronize the time with Coordinated Universal Time (UTC) specified by a first server, wherein the first server specifies only unmodified UTC time to the mobile device; and
the synchronizing comprises program instructions to retrieve the unmodified UTC time from the first server;
program instructions to retrieve offset values from an alternate device, wherein:
the offset values comprise one or more values to adjust one or more location coordinates and the offset values are associated with the synchronized time; and
the offset values that are associated with the synchronized time are determined by:
upon receiving a second set of GPS data at the alternate device, synchronizing time specified by the alternate device with unmodified UTC time specified by the first server, wherein the first server specifies only unmodified UTC time to the alternate device;
generating the offset values by comparing a known set of location coordinates of the alternate device to a set of location coordinates calculated using the second set of GPS data; and
associating the synchronized time with the offset values;

program instructions to calculate location coordinates of the mobile device using the first set of GPS data and the offset values; and program instructions to store at least the location coordinates of the mobile device and the synchronized time.

16. The computer system of claim 15, further comprising:
program instructions, stored on the one or more computer readable storage media for execution by at least one of the one or more processors, to grant an application access to at least the stored location coordinates of the mobile device and the synchronized time.

17. The computer system of claim 15, further comprising:
program instructions, stored on the one or more computer readable storage media for execution by at least one of the one or more processors, to calculate a velocity of the mobile device based on the location coordinates of the mobile device and a set of one or more stored location coordinates; and program instructions, stored on the one or more computer readable storage media for execution by at least one of the one or more processors, to determine a rate at which GPS data is to be collected based on, at least, the calculated velocity of the mobile device.

18. The computer system of claim 15, wherein program instructions to synchronize the time with UTC comprise:
program instructions to, responsive to the time being different than UTC, adjust the time to UTC.

19. The method of claim 1, wherein the known set of location coordinates are determined by:
collecting multiple samples of GPS data at the alternate device, wherein the alternate device is at a stationary location, over a period of time, and wherein the period of time is prior to the time; and averaging the collected multiple samples of GPS data.

* * * * *